(12) United States Patent
Strimpel et al.

(10) Patent No.: US 11,308,259 B2
(45) Date of Patent: Apr. 19, 2022

(54) WEB ELEMENT RETARGETING

(71) Applicant: ServiceNow, Inc., Santa Clara, CA (US)

(72) Inventors: Jason Strimpel, San Diego, CA (US); Michael England, Carlsbad, CA (US); Chase Murphy, Escondido, CA (US); Darren Richards, Oceanside, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/916,813

(22) Filed: Jun. 30, 2020

(65) Prior Publication Data

US 2021/0279403 A1 Sep. 9, 2021

Related U.S. Application Data

(60) Provisional application No. 62/986,928, filed on Mar. 9, 2020.

(51) Int. Cl.
*G06F 40/12* (2020.01)
*H04L 67/02* (2022.01)

(52) U.S. Cl.
CPC ............. *G06F 40/12* (2020.01); *H04L 67/02* (2013.01)

(58) Field of Classification Search
CPC ................................ G06F 40/12; H04L 67/02
USPC .................................................. 715/234, 766
See application file for complete search history.

(56) References Cited

U.S. PATENT DOCUMENTS

| 6,973,625 | B1 * | 12/2005 | Lupo | G06F 8/38 |
| | | | | 715/744 |
| 7,721,225 | B2 * | 5/2010 | Montroy | G06F 16/958 |
| | | | | 715/809 |
| 7,950,018 | B2 * | 5/2011 | Peller | G06F 9/526 |
| | | | | 719/312 |
| 8,276,140 | B1 * | 9/2012 | Beda, III | G06F 9/5077 |
| | | | | 718/1 |
| 8,429,604 | B1 * | 4/2013 | Blas | G06F 8/75 |
| | | | | 717/113 |
| 8,711,788 | B2 * | 4/2014 | Krco | H04W 76/27 |
| | | | | 370/329 |
| 8,892,687 | B1 * | 11/2014 | Call | H04L 67/42 |
| | | | | 709/217 |
| 9,083,739 | B1 * | 7/2015 | Call | H04L 63/1441 |
| 9,363,134 | B1 * | 6/2016 | Goodspeed | G06F 16/954 |
| 9,405,851 | B1 * | 8/2016 | Steele, III | G06F 16/9574 |
| 9,563,713 | B2 * | 2/2017 | Lee | G06F 16/972 |
| 9,998,477 | B2 * | 6/2018 | Kaiho | G06F 21/6218 |
| 10,216,488 | B1 * | 2/2019 | Overson | H04L 63/0428 |

(Continued)

OTHER PUBLICATIONS

David Walsh; How JavaScript Event Delegation Works; Mar. 7, 2011; davidwalsh.name; 13 pages.*

(Continued)

*Primary Examiner* — Andrew R Dyer
(74) *Attorney, Agent, or Firm* — Van Pelt, Yi & James LLP

(57) ABSTRACT

A determination is made whether a source web element is to be retargeted. In response to the determination that the source web element is to be retargeted, one or more properties or attributes of the source web element is copied to a target web element and content of the source web element is routed to be rendered to the target web element. An event of the target web element is intercepted, and the intercepted event is provided to the source web element.

20 Claims, 7 Drawing Sheets

(56) References Cited

U.S. PATENT DOCUMENTS

| | | | |
|---|---|---|---|
| 10,567,419 B2* | 2/2020 | Hansen | H04L 63/1441 |
| 10,846,356 B2* | 11/2020 | Gopalakrishnan | G06F 16/9574 |
| 2002/0059367 A1* | 5/2002 | Romero | G06F 16/9577 709/203 |
| 2002/0147745 A1* | 10/2002 | Houben | G06F 40/221 715/234 |
| 2003/0005152 A1* | 1/2003 | Diwan | H04L 29/12113 709/239 |
| 2003/0070004 A1* | 4/2003 | Mukundan | G06F 9/548 719/330 |
| 2005/0261909 A1* | 11/2005 | Sienel | H04L 67/02 704/270.1 |
| 2007/0016949 A1* | 1/2007 | Dunagan | G06F 21/53 726/22 |
| 2007/0297029 A1* | 12/2007 | Low | G06F 40/106 358/527 |
| 2010/0199197 A1* | 8/2010 | Faletski | G06F 16/9577 715/760 |
| 2011/0015917 A1* | 1/2011 | Wang | G06F 40/143 703/23 |
| 2011/0099294 A1* | 4/2011 | Kapur | H04L 67/02 709/246 |
| 2011/0289140 A1* | 11/2011 | Pletter | G06F 8/38 709/203 |
| 2011/0307833 A1* | 12/2011 | Dale | G06F 3/0488 715/835 |
| 2013/0219263 A1* | 8/2013 | Abrahami | G06F 40/103 715/234 |
| 2015/0143459 A1* | 5/2015 | Molnar | G06F 21/60 726/2 |
| 2015/0310124 A1* | 10/2015 | Ben-Aharon | G06F 40/106 715/205 |
| 2015/0331874 A1* | 11/2015 | Balasubramanian | G06F 16/9577 707/756 |
| 2015/0370763 A1* | 12/2015 | Wang | G06F 40/14 715/235 |
| 2016/0285841 A1* | 9/2016 | Marcy | H04W 12/068 |
| 2017/0309309 A1* | 10/2017 | Kaldma | G11B 27/34 |
| 2017/0364494 A1* | 12/2017 | Khoo | G06F 40/154 |
| 2018/0217849 A1* | 8/2018 | Gullen | G06F 3/04842 |

OTHER PUBLICATIONS

How to Only trigger parent click event when a child is clicked; Nov. 30, 2017; stackoverflow.com; 13 Pages.*

"Handle and fire events;" Polymer Library; Mar. 5, 2019; https://polymer-library.polymer-project.org; pp. 1-3.*

Kartikay Bhutani; JavaScript | Redirect a URL; Feb. 19, 2019; GeeksForGeeks; https://www.geeksforgeeks.org/javascript-redirect-a-url; pp. 1-6.*

Ian Anderson; Show and Hide Different Content on Mobile Devices & Desktops; 2015; webdesignersacademy.com; pp. 1-10.*

* cited by examiner

WEB ELEMENT RETARGETING

CROSS REFERENCE TO OTHER APPLICATIONS

This application claims priority to U.S. Provisional Patent Application No. 62/986,928 entitled WEB ELEMENT RETARGETING filed Mar. 9, 2020 which is incorporated herein by reference for all purposes.

BACKGROUND OF THE INVENTION

Web development allows for the creation of complex and interactive web elements. These elements can be used to create user interface components such as popovers, modals, tooltips, and alerts. The elements can also be used to manipulate and display media such as video and pictures. The elements can be interactive. For example, elements can receive data and respond to user mouse clicks and touches.

BRIEF DESCRIPTION OF THE DRAWINGS

Various embodiments of the invention are disclosed in the following detailed description and the accompanying drawings.

DETAILED DESCRIPTION

Figure 1:
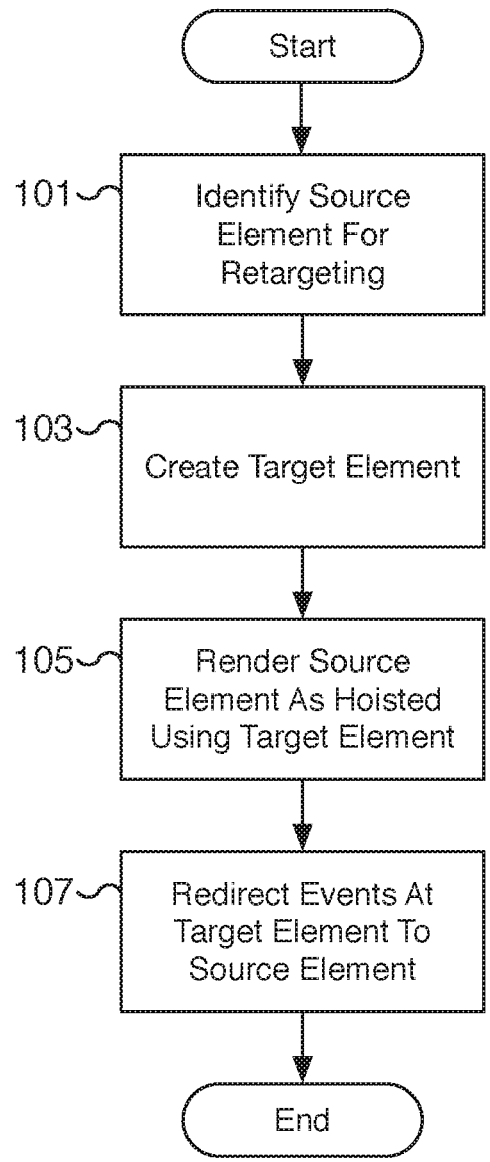
FIG. 1 is a flow chart illustrating an embodiment of a process for retargeting a web element.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for web element retargeting is disclosed. By allowing web developers to retarget web elements, including by initiating the retargeting dynamically and programmatically, web developers can create web elements that can be repositioned independent of the element's context. Traditionally, web elements are rendered within the element's stacking context, limiting control over the positioning of the element's view based on the element's position in the Document Object Model (DOM) tree. By retargeting a web element, a web element's view can be rendered independent of the element's position in the DOM tree, effectively granting the developer the ability to hoist the rendered view. In various embodiments, the retargeting allows a developer to position a web element's rendered view based on the context of a retargeted web element. For example, the rendered view of an element can be positioned with respect to any element in the DOM tree, such as a child of the body element or another container node. The disclosed retargeting technique allows a developer refined control over the Z-position of a web element's view and allows a web element to be positioned, for example, at the top of the stacking context. This is particularly helpful for certain web user interface elements such as popups, modals, tooltips, and alerts. Control over stacking context is also beneficial for displaying and interacting with media such as playing videos. Retargeted web elements can be rendered in front of other elements to prevent the retargeted element from being hidden behind another element of the webpage. Furthermore, events directed at the rendered element view are captured at the retargeted web element and redirected to the original source web element. This redirection allows the event to be processed as if they were initially dispatched at the source web element. Any updates to properties and content to the source web element are reflected in the retargeted element.

In some embodiments, a determination is made whether a source web element is to be retargeted. For example, an attribute can be included for a source web element to designate the web element for retargeting. The attribute indicates that the rendered view of the element will be hoisted and should not be confined to the stacking content of the original source web element. For example, the attribute "now-hoist" can be added to a web element node. In response to a determination that the source web element is to be retargeted, one or more properties or attributes of the source web element are copied to a target web element and content of the source web element is routed to be rendered to the target web element. By copying the properties and attributes of the source web element to the target web element, the contents of the target web element properly reflect the original source web element. In various embodiments, an event of the target web element is intercepted and the intercepted event is provided to the source web element. For example, a mouse action modifying settings of a modal rendered using the target web element is redirected to the original source web element. The redirected user mouse interaction allows the source web element to modify the appropriate properties and attributes associated with the user modification. In some embodiments, the retargeting is dynamic and can be controlled programmatically. For example, in the event the original source web element no longer needs retargeting, the retargeting attribute can be disabled to detach the target web element from the source web element and to disable retargeting. Once disabled, the view of the source element can be rendered using the context of the source element, if applicable. In some embodiments, the target web element can be referenced from the context of the source web element. For example, the view of the target element can be queried from within the context of the source web element.

FIG. 1 is a flow chart illustrating an embodiment of a process for retargeting a web element. Using the process of FIG. 1, a web element can be identified for retargeting and allows a web element to be hoisted. The web element is rendered using a target element attached to a container node. For example, a target element can be attached to a body node to reposition the rendered view of the source web element with respect to the body node, bypassing the stacking context of the original source web element. Events targeting the target element node are redirected to the source web node and function as if originally dispatched at the source web element.

At 101, a source element is identified for retargeting. For example, a source web element is identified for hoisting by including a hoisting attribute. For example, the attribute "now-hoist" can be added to a web element node. When the node is processed, the attribute identifies that the web element should utilize a container node. A target element is attached to the container node to reposition the rendered view of the web element. In some embodiments, a default container node, such as the body element, is utilized. In various embodiments, an attribute can be included to specify a particular container node, for example, a node other than the body element. In some embodiments, an attribute can further specify whether to prepend or append the target element to the container node. For example, the attribute "now-hoist-append-to" can be added to a web element node to append a target node to a given node. Similarly, the attribute "now-hoist-prepend-to" can be added to a web element node to prepend a target node to a given node. By utilizing different attachment actions, such as a prepend or append action, the source element can be positioned relative to the different children of the container node.

At 103, a target element is created. For example, a target element is created to hoist the source web element. In some embodiments, the creation of the target element includes copying the context of the source web element. For example, one or more properties or attributes of the source web element are copied to the target element. The copied properties and attributes allow the target element to be rendered as intended. In some embodiments, one or more different hooks are associated and/or installed in the target web element to redirect events to the original source element. For example, one or more event handlers of the target web element can be used to capture events directed at the target element and redirect the events to the source element. In various embodiments, the listeners of the source web element can be modified to receive the redirected events as if originally dispatched at the source web element.

At 105, the source element is rendered as hoisted by using the target element. For example, the source element is rendered using the stacking context (and Z-position) of the target element. This allows the rendered view of the source element to be positioned in front of other web elements. For example, using the body node as a container node for the target element, the rendered view is positioned using the stacking context of the body node and in front of other web elements for the webpage. The source element is rendered independent of the stacking context of the source web element but reflects the context of the source web element. In some embodiments, different attachment actions can be utilized to position the rendered view of the source element relative to different child nodes of the container node.

At 107, events at the target element are redirected to the source element. For example, events captured at the target web element are redirected to the source element. The events may be received at the source element using an associated and/or installed event listener. In various embodiments, events directed to the hoisted view are processed at the source web element as if the events were originally dispatched at the source web element. Any changes to properties or attributes can be propagated to the target element to keep the contents of the target element in sync with the original source element. For example, a user interface action such as a mouse click on the rendered view of the target element is rerouted to the source element. In some embodiments, a video playback element including controls for playback can be hoisted. When the user interacts with the video controls, for example, to modify the volume or control playback by seeking, pausing, resuming, etc., the interaction is captured by the target web element and rerouted to the original source element. The source element can process the interaction and update the target element accordingly.

Figure 2:
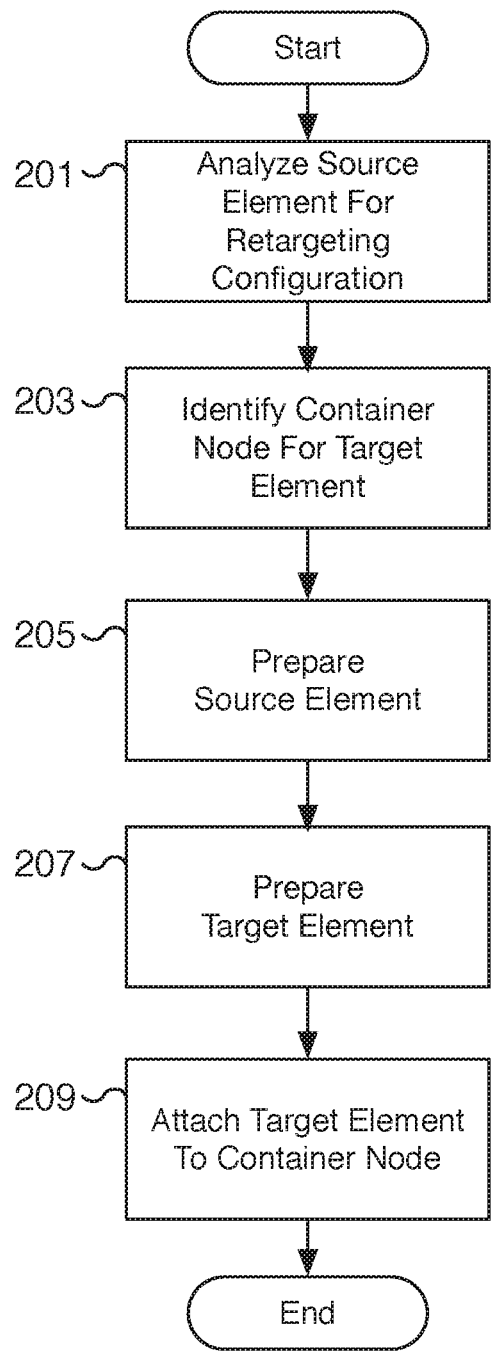
FIG. 2 is a flow chart illustrating an embodiment of a process for preparing the retargeting of a web element.

FIG. 2 is a flow chart illustrating an embodiment of a process for preparing the retargeting of a web element. Using the process of FIG. 2, a web element identified for retargeting is prepared for hoisting. In some embodiments, the process is initiated by including an attribute in the source web element. For example, in various embodiments, an attribute such as "now-hoist" can be added to a web element node to initiate hoisting. In some embodiments, the preparation for hoisting includes creating a target web element of the source web element and attaching the target web element to a container node. In some embodiments, the process of FIG. 2 is performed at 101 and/or 103 of FIG. 1.

At 201, the retargeting configuration of a source element is analyzed. For example, a programming script using a language such as JavaScript for a webpage is processed and analyzed for retargeting configuration parameters. The parameters can include one or more attributes to configure the retargeting including enabling retargeting, specifying a container node for positioning the retargeting, and specifying an attachment action to determine the attachment relationship with the container node, among others. For example, an attribute such as "now-hoist" can be added to a web element node to enable retargeting. Other attributes can be set to configure how retargeting is performed. For example, positioning can be based on a specified container node using attributes such as "now-hoist-append-to" and "now-hoist-prepend-to."

In some embodiments, the configuration includes an attachment relationship to the container node. For example, the attribute "now-hoist-append-to" can be added to the source element to append a target node to a given node. Similarly, the attribute "now-hoist-prepend-to" can be added to the source element to prepend a target node to a given node. By utilizing different attachment actions, such as a prepend or append action, the source element can be positioned relative to the different children of the container node.

At 203, a container node for a target element is identified. For example, in some embodiments, an attribute of the source web element analyzed at 201 specifies a container node. Alternatively, a default container node such as the body element node can be used. The identified container node of the DOM tree of the webpage is used as the context for retargeting. For example, the stacking context of the container node is applied to the target web element attached to the container node.

At 205, the source element is prepared. For example, the source element is prepared so that events directed at the target web element are processed by the source element as if originally dispatched at the source web element. For example, one or more event listeners can be associated and/or installed to process events redirected from the target web element used for retargeting. The event handlers can process the redirected events such that the rerouted events appear to be originally dispatched at the source web element.

In some embodiments, the source element is prepared so that the source element view is rendered to the target web element. For example, rendering of the source element view can be disabled to allow the target web element view to be rendered utilizing the stacking context of the target element instead of the source web element.

At 207, a target element is prepared. For example, a target web element node is created using the contents of the source web element. In some embodiments, one or more properties or attributes of the source web element are copied to a target web element. By copying the contents of the source web element, the style and contents of the rendered view of the target web element are controlled by the source element while allowing the stacking context of the target web element to be dictated by the target's relationship to its container node. In some embodiments, one or more event handlers can be associated and/or installed within the target web element to intercept events and redirect them to the source web element.

At 209, the target element is attached to the container node. In some embodiments, the target element prepared at 207 is attached to the container node identified at 203. For example, the target element can be attached to a container node of the DOM tree such as the body node. In some embodiments, the container node contains one or more children and the target node can be attached to the container node relative to the children. For example, the target element node can be prepended before or appended after a child of the container node. In some embodiments, the target element is prepended before all children or appended behind all children of the container node. In various embodiments, the appropriate attachment relationship is identified at 201 when analyzing the retargeting configurations.

Figure 3:
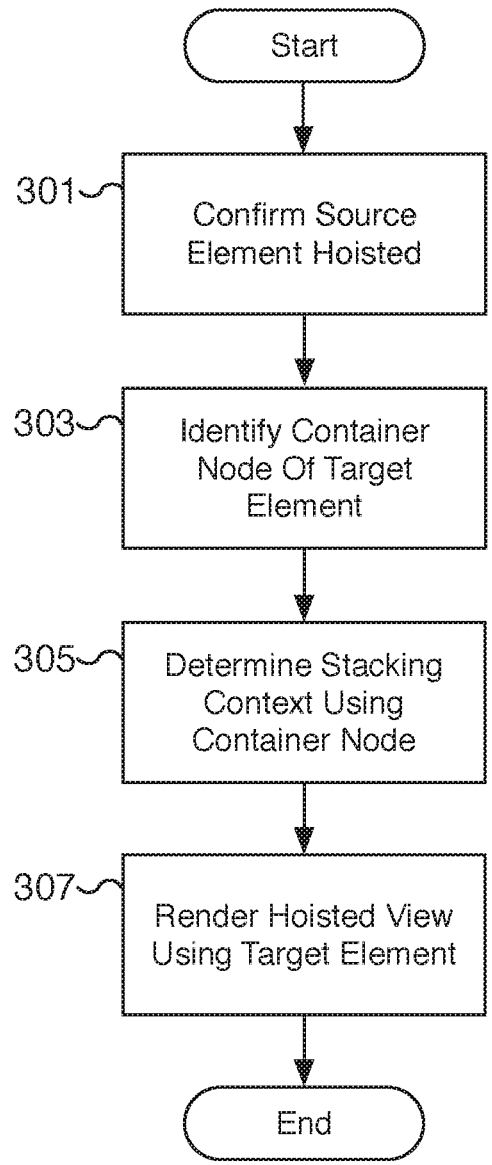
FIG. 3 is a flow chart illustrating an embodiment of a process for rendering a retargeted web element.

FIG. 3 is a flow chart illustrating an embodiment of a process for rendering a retargeted web element. Using the process of FIG. 3, a source web element can be hoisted and rendered outside its stacking context. Instead of being limited to the source element's stacking context, a target element's stacking context is utilized. The target element's stacking context is based on the container node to which the target element is attached. Other than the stacking context, all style and contents are based on the source web element. In some embodiments, the process of FIG. 3 is performed at 105 of FIG. 1. In various embodiments, the process is performed in response to applying a retargeting attribute to the source web element.

At 301, hoisting of the source element is confirmed. For example, a hoisting or retargeting attribute of the source web element is confirmed to be enabled. In some embodiments, the retargeting can be enabled and disabled dynamically and/or programmatically. At 301, a confirmation is made that the retargeting is enabled before proceeding to render the hoisted view.

At 303, the container node of the target element is identified. For example, as part of the web document rendering process, the DOM tree of the document is traversed until the container node and then the target node are reached. The container node is identified as the parent of the target node. The container node is identified in order to apply the stacking content of the container node to the target node.

At 305, the stacking context is determined using the container node. For example, the Z-ordering of the container node is applied to determine the Z-ordering of the target node. Since the container node is the target node's parent, the target node's stacking context and relative order in front or behind of other rendered components is determined relative to the container node. As a result, the stacking value of the target web element is different from the stacking value of the source web element. Using the determined stacking context, the Z-position of the target node can be determined as well. In some embodiments, the Z-position of the target node can be further modified relative to the container node programmatically. In some embodiments, the target node is one of many children of the container node and the target node is positioned relative to the container node and its other children.

At 307, the hoisted view is rendered using the target element. Using the Z-position determined at 305, the view of the target element is rendered. Since the target element is hoisted to a different position in the DOM tree than the source element, the view is rendered in a position independent of the stacking context of the source web element. The rendered view of the hoisted source element can be displayed without being occluded by other components regardless of where the source element resides in the DOM tree. Moreover, the styling used for the rendered view is based on the source web element and is independent of the container node.

Figure 4:
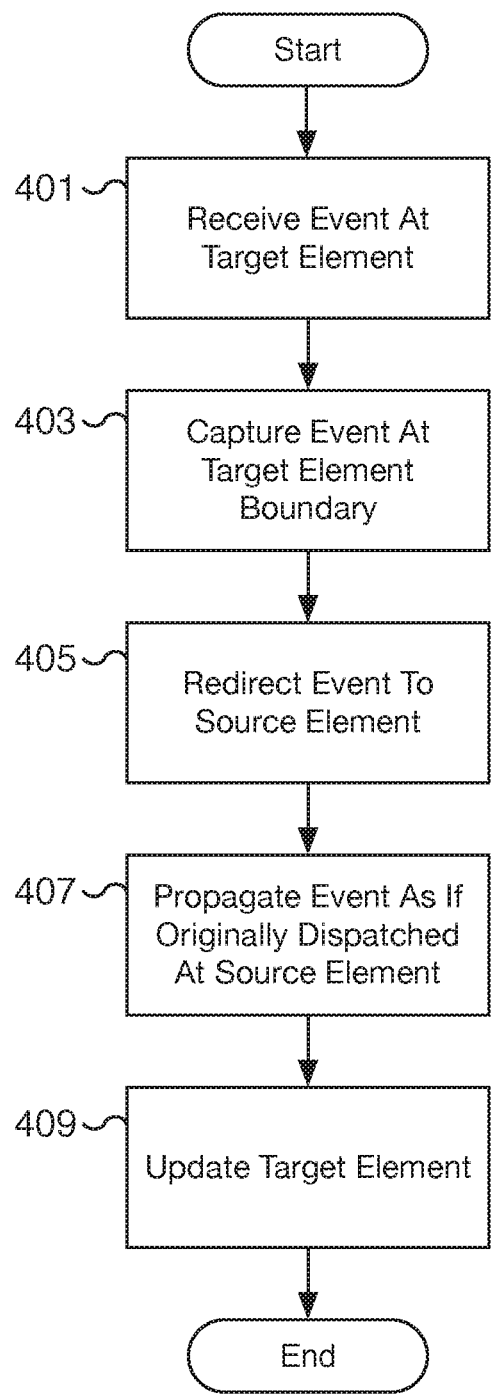
FIG. 4 is a flow chart illustrating an embodiment of a process for redirecting events captured at a target web element.

FIG. 4 is a flow chart illustrating an embodiment of a process for redirecting events captured at a target web element. Using the process of FIG. 4, events directed at a target web element are intercepted and redirected to the source web element. The redirected events are dispatched at the source web element as if they originated at the source element instead of the target element. User interaction with the target element functions as if interacting with the source element. In some embodiments, the process of FIG. 4 is performed at 107 of FIG. 1.

At 401, an event is received at a target element. For example, a user interaction directed at a target view is captured. The rendered element may correspond to a popover, modal, tooltip, or alert element. In some embodiments, the rendered element may be a video, a form, an object, a picture, or another custom HTML element. User interactions such as mouse interactions, touch actions, etc. directed at the rendered component are received. For example, a scrub action directed at a video component is received. As another example, a navigation action directed at a tooltip to further explore a topic is received.

At 403, the event is captured at the boundary of the target element. In various embodiments, the received event is processed by one or more event handlers of the target element but is not propagated past the boundary of the target element. Instead, the event is intercepted at the boundary of the target element and its container node.

At 405, the event is redirected to the source element. The event captured and intercepted at 403 is rerouted to the source web element. For example, a scrub action using a mouse or touch action is redirected to the source web element that has been hoisted. As another example, a close action directed at the target web element is redirected to the source web element. Similarly, a selection action directed at the target web element is redirected to the source web element. In some embodiments, the redirection is implemented by creating a second event based on the event captured at 403. The second event is directed to originate from the source web element.

At 407, the event is propagated as if originally dispatched at the source element. Once redirected to the source web element, the event is dispatched at the source element as if it originated at the source and not the target element. In some embodiments, one or more event handlers of the source web element handle the redirected event. The event is propagated as if originating at the source element. For example, a scrub action directed at video content rendered to the target element is processed by the source element to advance the content appropriately. As another example, a navigation action to further explore a topic directed at a tooltip that is rendered to the target element is processed by the source web element. The source web element is responsible for processing the action to implement the logic behind the expected navigation.

At 409, the target element is updated. In some embodiments, updates to the contents of the source web element are synchronized to the target element. For example, one or more properties or attributes of the source web element are copied over to the target element. In various embodiments, the update keeps the target element and source element synchronized and reflects the processing of the intercepted event.

Figure 5A:
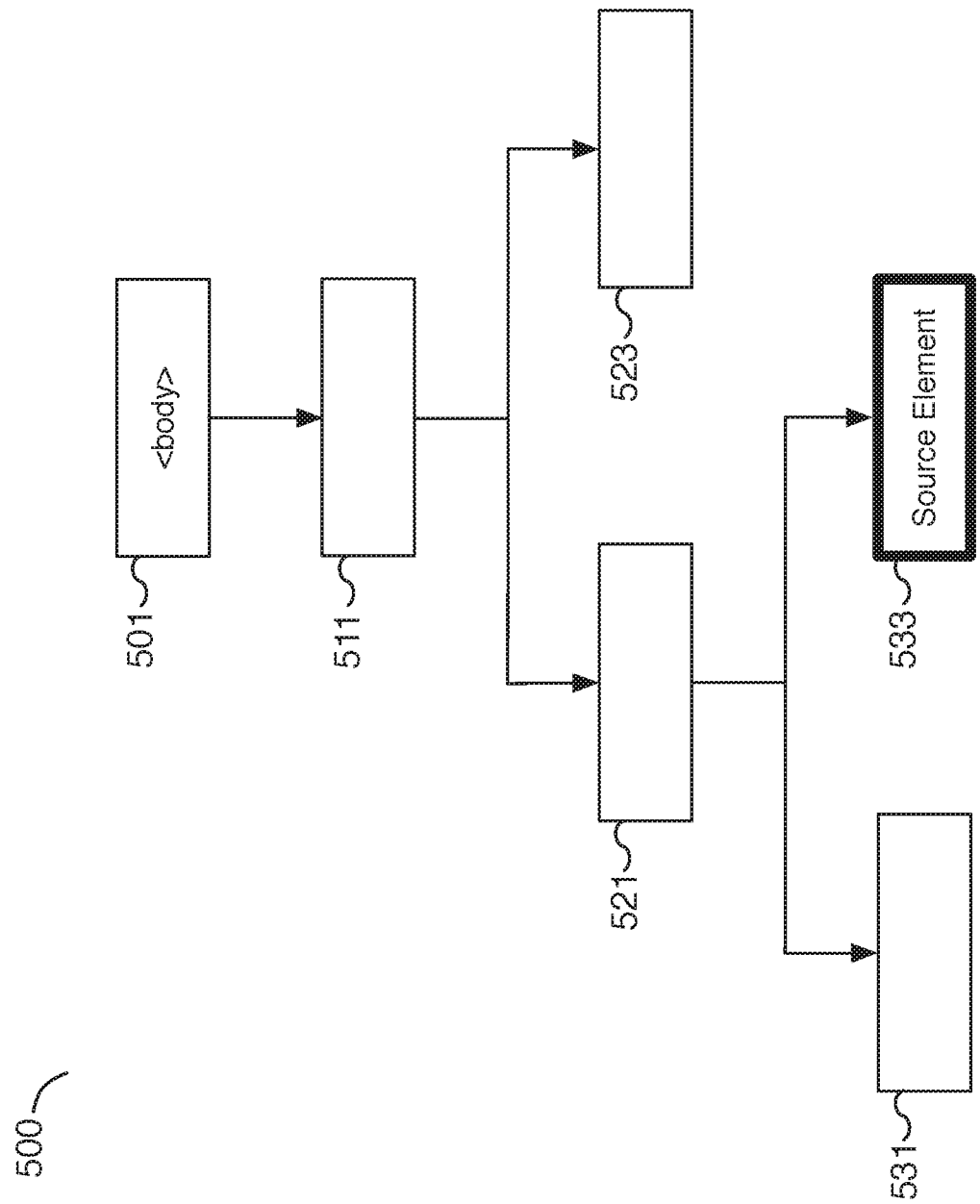
FIG. 5A is a block diagram illustrating an example DOM tree of a web document prior to the retargeting of a web element.

FIG. 5A is a block diagram illustrating an example DOM tree of a web document prior to the retargeting of a web element. In the example shown, DOM tree 500 is a partial DOM tree of a web document. DOM tree 500 includes nodes 501, 511, 521, 523, 531, and 533. The body node 501 corresponds to the body element of the web document. In some embodiments, body node 501 is a child of an html node. In the example shown, body node 501 has one child, node 511. Node 511 has two children, nodes 521 and 523. Node 521 has two children, nodes 531 and 533. Node 533 corresponds to a source element node that is to be retargeted. In various embodiments, node 533 can be retargeted using the techniques described herein including one or more of the processes of FIGS. 1-4. For example, a hoist attribute can be added to the source web element of node 533 to enable retargeting. The attribute can rely on a default container, such as body node 501, or specify a particular container from which to hoist the element. In some embodiments, the attribute is a "now-hoist" attribute to utilize the default container node or a "now-hoist-append-to" or "now-hoist-prepend-to" attribute to specify a particular container node.

Figure 5B:
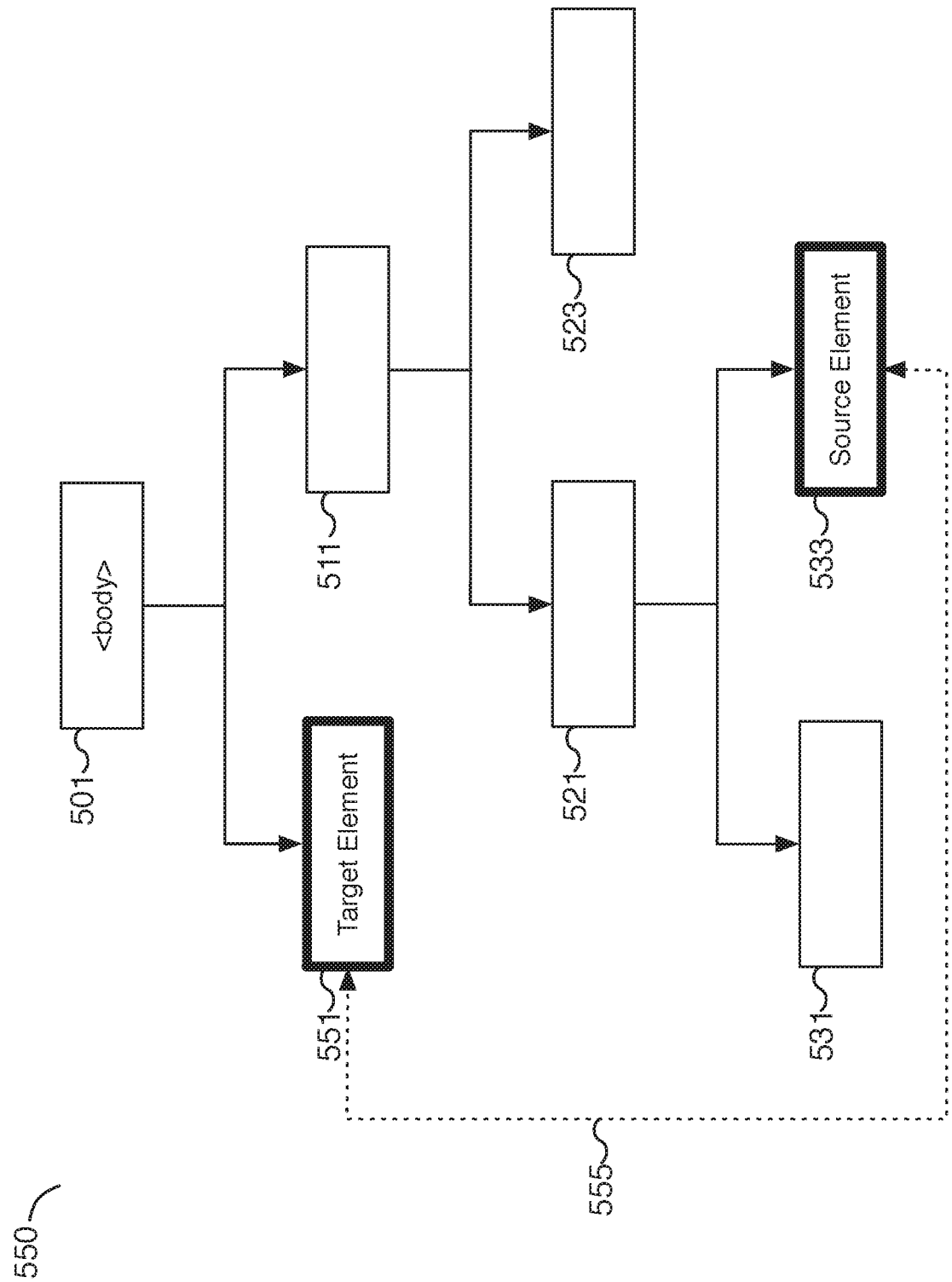
FIG. 5B is a block diagram illustrating an example DOM tree of a web document with a retargeted web element.

FIG. 5B is a block diagram illustrating an example DOM tree of a web document with a retargeted web element. In various embodiments, DOM tree 550 is a partial DOM tree of a web document after retargeting the source element of node 533 of FIG. 5A. In the example shown, DOM tree 550 includes existing nodes 501, 511, 521, 523, 531, and 533 of DOM tree 500 and adds new node 551. In the example of FIG. 5B, node 533 is a source node and node 551 is a target node. Source node 533 is retargeted to target node 551 using body node 501 as a container node. Target node 551 is created and attached to body node 501 and utilized the stacking context based on body node 501. In the example of FIG. 5B, target node 551 is attached as a child to body node 501 using a prepend attachment action. Connection 555 represents the retargeting relationship between source node 533 and target node 551. The web source element of source node 533 is rendered to target node 551 and events directed at target node 551 are redirected to source node 533 and dispatched at the source element of source node 533. In various embodiments, target node 551 can be referenced from the source web element of source node 533. For example, the view contents of target node 551 can be accessed and/or queried via source node 533.

Figure 6:
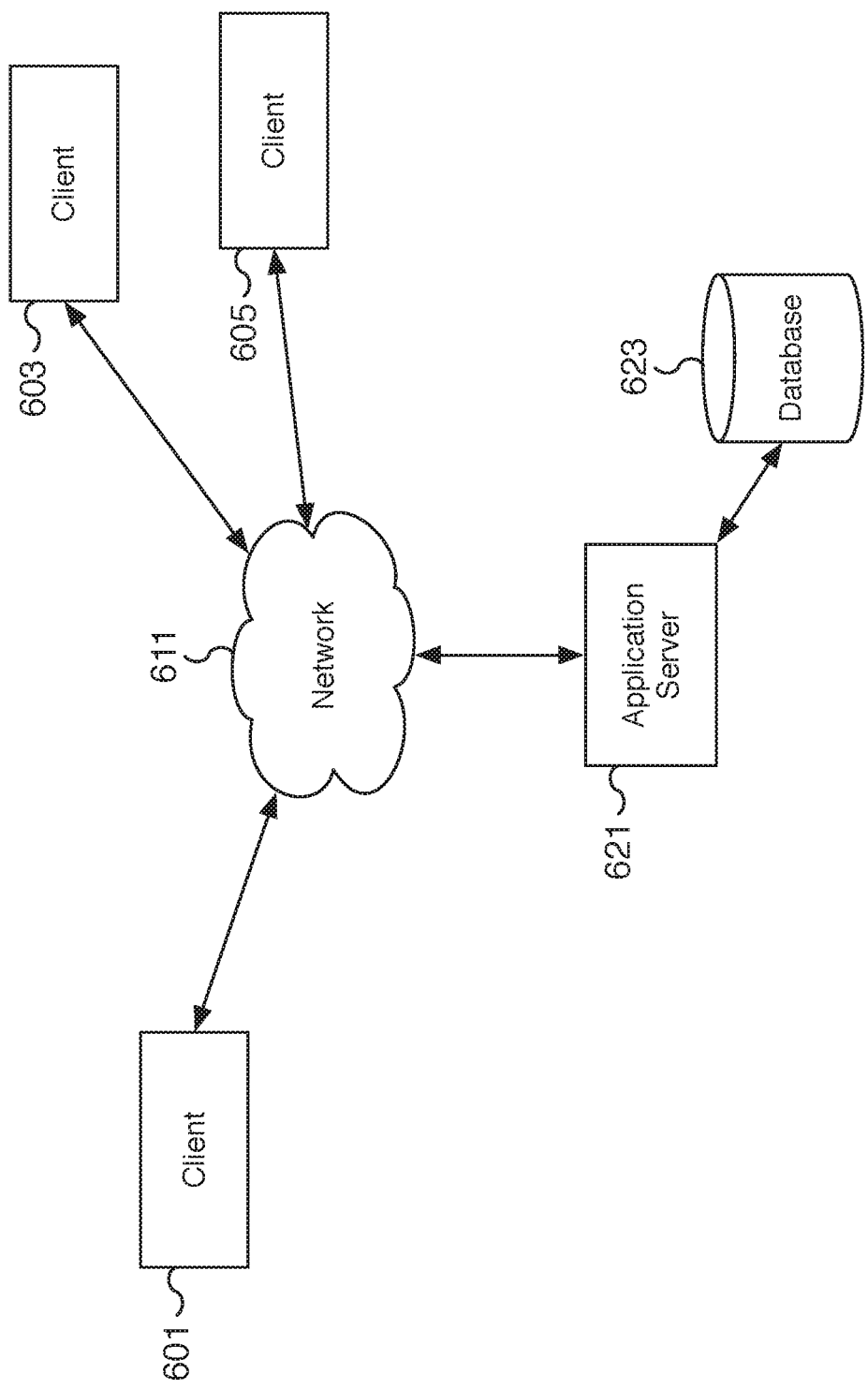
FIG. 6 is a block diagram illustrating an example of a network environment for retargeting a web element.

FIG. 6 is a block diagram illustrating an example of a network environment for retargeting a web element. In the example shown, clients 601, 603, and 605 access services on application server 621 via network 611. Network 611 can be a public or private network. In some embodiments, network 611 is a public network such as the Internet. In various embodiments, clients 601, 603, and 605 are network clients such as web browsers for accessing web services. Application server 621 provides web services including web applications. Application server 621 may utilize database 623 to provide certain services. For example, database 623 can be a configuration management database (CMDB) used by application server 621 for providing CMDB services. Among other information, database 623 can store configuration information related to managed assets, such as related hardware and/or software configurations.

In some embodiments, each of clients 601, 603, and 605 supports web element retargeting by processing web documents provided by application server 621. For example, JavaScript code included in a web document is processed by a client such as clients 601, 603, and/or 605 to hoist a web element using the techniques described herein and/or one or more of the processes of FIGS. 1-4. In some embodiments, at least portions of the techniques may be implemented as part for a library, such as a JavaScript library, that clients download. In some embodiments, the library or portions of the library may or may not be provided by application server 621 along with the web document utilizing the library for retargeting. Other programming languages or web development implementations of the techniques described herein are appropriate as well. Clients 601, 603, and 605 can be a network client running on one of many different computing devices, including laptops, desktops, mobile devices, tablets, kiosks, smart televisions, etc.

In various embodiments, one or more services provided by application server 621 describe a user interface that includes a retargeted web element. For example, the user interface processed by a client, such as one of clients 601, 603, or 605, includes a hoisted web element. The user interface element is rendered on top of other rendered portions of the web document outside of the initial context of the source web element. Examples of user interface elements include popups, modals, tooltips, and alerts, among others. As another example, the user interface element hoisted can display and allow a user of a client to interact with media such as videos.

Although single instances of some components have been shown to simplify the diagram, additional instances of any of the components shown in FIG. 6 may exist. For example, application server 621 may include one or more servers. Similarly, database 623 may not be directly connected to application server 621 and/or may be replicated or distributed across multiple components. As another example, clients 601, 603, and 605 are just a few examples of potential clients to application server 621. Fewer or more clients can connect to application server 621. In some embodiments, components not shown in FIG. 6 may also exist.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    performing an analysis to determine whether a source web element is to be retargeted and determining that the source web element is to be retargeted;
    in response to the determination that the source web element is to be retargeted:
        copying one or more properties or attributes of the source web element to a target web element within a same Document Object Model; and
        routing content of the source web element to be rendered to the target web element;
    intercepting an event of the target web element that is different from the source web element, wherein the source web element is not a parent of the target web element;
    providing within the same Document Object Model the intercepted event of the target web element to the source web element that was a source of the content retargeted to the target web element to allow the intercepted event to be dispatched as if it originated from the source web element, wherein providing the intercepted event to the source web element includes redirecting the intercepted event to the source element after the content of the source web element having been already routed to the target web element;
    identifying that an attribute for retargeting the source web element is no longer enabled;
    determining that the source web element is no longer to be retargeted;
    disabling the target web element; and
    rendering a view of the source web element.

2. The method of claim 1, wherein performing the analysis to determine whether the source web element is to be retargeted includes identifying an attribute of the source web element utilized in determining whether the source web element is to be retargeted.

3. The method of claim 1, further comprising attaching the target web element to a container node, wherein the container node is a separate node in a Document Object Model (DOM) tree.

4. The method of claim 3, wherein the container node is associated with a body node of the DOM tree.

5. The method of claim 3, wherein an attribute of the source web element specifies the container node.

6. The method of claim 3, wherein an attribute of the source web element specifies an attachment action using the container node.

7. The method of claim 6, wherein the attachment action using the container node is a prepend action or an append action.

8. The method of claim 3, wherein a styling of the target web element is independent of the container node.

9. The method of claim 1, wherein a first stacking value of the target web element is different from a second stacking value of the source web element.

10. The method of claim 9, wherein a stacking order of the target web element is based on the first stacking value of the target web element and is independent of the second stacking value of the source web element.

11. The method of claim 10, wherein the stacking order of the target web element is further based on a stacking order of the parent of the target web element.

12. The method of claim 1, wherein the source web element is a popover, modal, tooltip, or alert element.

13. The method of claim 1, wherein the source web element is a video, form, object, picture, or a custom HTML element.

14. The method of claim 1, wherein intercepting the event of the target web element includes creating an event handler within the target web element, and wherein providing the intercepted event to the source web element includes associating an event listener within the source web element.

15. The method of claim 14, wherein providing the intercepted event to the source web element further includes creating and originating at the source web element a second event based on the intercepted event, and wherein the intercepted event originates from the target web element and the second event originates from the source web element.

16. The method of claim 1, further comprising providing a reference to the target web element within a context of the source web element.

17. The method of claim 16, wherein the reference to the target web element is used to query a view of the target web element within the context of the source web element.

18. A system, comprising:
    one or more processors configured to:
        perform an analysis to determine whether a source web element is to be retargeted and determine that the source web element is to be retargeted;
        in response to the determination that the source web element is to be retargeted:
            copy one or more properties or attributes of the source web element to a target web element within a same Document Object Model; and
            route content of the source web element to be rendered to the target web element;
        intercept an event of the target web element that is different from the source web element, wherein the source web element is not a parent of the target web element;
        provide within the same Document Object Model the intercepted event of the target web element to the source web element that was a source of the content retargeted to the target web element to allow the intercepted event to be dispatched as if it originated from the source web element, wherein being configured to provide the intercepted event to the source web element includes being configured to redirect the intercepted event to the source element after the content of the source web element having been already routed to the target web element;
        identify that an attribute for retargeting the source web element is no longer enabled;
        determine that the source web element is no longer to be retargeted;
        disable the target web element; and
        render a view of the source web element; and
    a memory coupled to at least one of the one or more processors and configured to provide the at least one of the one or more processors with instructions.

19. The system of claim 18, wherein intercepting the event of the target web element includes creating an event handler within the target web element, and wherein providing the intercepted event to the source web element includes associating an event listener within the source web element.

20. A computer program product, the computer program product being embodied in a non-transitory computer readable storage medium and comprising computer instructions for:
- performing an analysis to determine whether a source web element is to be retargeted and determining that the source web element is to be retargeted;
- in response to the determination that the source web element is to be retargeted:
  - copying one or more properties or attributes of the source web element to a target web element within a same Document Object Model; and
  - routing content of the source web element to be rendered to the target web element;
- intercepting an event of the target web element that is different from the source web element, wherein the source web element is not a parent of the target web element;
- providing within the same Document Object Model the intercepted event of the target web element to the source web element that was a source of the content retargeted to the target web element to allow the intercepted event to be dispatched as if it originated from the source web element, wherein providing the intercepted event to the source web element includes redirecting the intercepted event to the source element after the content of the source web element having been already routed to the target web element;
- identifying that an attribute for retargeting the source web element is no longer enabled;
- determining that the source web element is no longer to be retargeted;
- disabling the target web element; and
- rendering a view of the source web element.

* * * * *